(12) United States Patent
Kampf et al.

(10) Patent No.: US 8,746,072 B2
(45) Date of Patent: Jun. 10, 2014

(54) PRESSURE SWITCH HAVING A TRANSDUCER OR PIN EXTENDING INTO THE FLUID FLOW PATH

(75) Inventors: Marcus Kampf, Berlin (DE); Jürgen Kreutzkämper, Berlin (DE); Fabian Schmidt, Großbeeren (DE); Dieter Schönherr, Kleinbeeren (DE)

(73) Assignee: Aktiebolaget SKF, Gothenburg (SE)

( * ) Notice: Subject to any disclaimer, the term of this patent is extended or adjusted under 35 U.S.C. 154(b) by 285 days.

(21) Appl. No.: 13/224,777

(22) Filed: Sep. 2, 2011

(65) Prior Publication Data

US 2012/0132507 A1 May 31, 2012

(30) Foreign Application Priority Data

Sep. 3, 2010 (DE) .......................... 10 2010 040 213

(51) Int. Cl.
*G01L 9/00* (2006.01)
*G01L 7/00* (2006.01)

(52) U.S. Cl.
USPC ............................................. 73/700; 73/756

(58) Field of Classification Search
None
See application file for complete search history.

(56) References Cited

U.S. PATENT DOCUMENTS 4,227,420 A * 10/1980 Lamadrid ........................ 73/756
5,712,424 A * 1/1998 Reed ........................... 73/114.16
5,756,892 A * 5/1998 Porro et al. ..................... 73/147

FOREIGN PATENT DOCUMENTS

| DE | 1957687 A | 11/1969 |
| DE | 10155839 A1 | 6/2002 |
| JP | 08304197 A | 11/1996 |
| JP | 2002197952 A | 7/2002 |
| WO | WO 9624028 A1 * | 8/1996 |

* cited by examiner

*Primary Examiner* — Lisa Caputo
*Assistant Examiner* — Jermaine Jenkins
(74) *Attorney, Agent, or Firm* — Bryan Peckjian; SKF USA Inc. Patent Department

(57) ABSTRACT

A pressure switch comprises a housing having a cavity for conveying a pressurized fluid. The cavity extends from an inlet to an outlet and defines a flow path for the fluid. A pressure-transducing element is provided for measuring the fluid pressure. The pressure-transducing element is in fluid communication with the cavity and is at least partially disposed in the flow path between the inlet and the outlet. The pressure-transducing element has a cylindrical shape with a constant diameter and is partially disposed in a bore in the housing. The bore has a constant bore diameter. One end of the pressure-transducing element extends into the flow path.

20 Claims, 1 Drawing Sheet

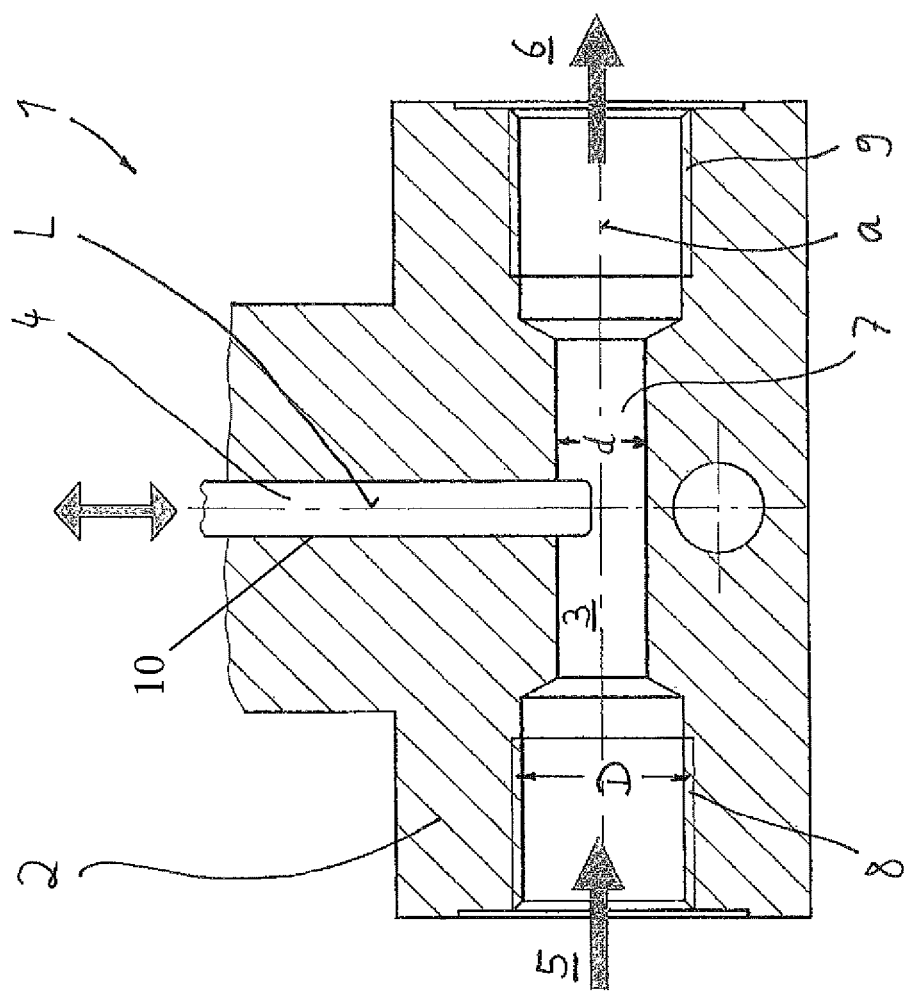

PRESSURE SWITCH HAVING A TRANSDUCER OR PIN EXTENDING INTO THE FLUID FLOW PATH

CROSS-REFERENCE

This application claims priority to German patent application no. 10 2010 040 213.3 filed on Sep. 3, 2010, the contents of which are incorporated herein by reference as if fully set forth herein.

TECHNICAL FIELD

The present invention generally relates to a pressure switch, which may be utilized to measure the pressure of a fluid, such as grease.

BACKGROUND ART

Known pressure switches include a housing having a cavity for receiving a fluid under pressure. A pressure-transducing element is in fluid communication with the cavity and is utilized to measure the pressure of the fluid. The cavity extends from an inlet to an outlet of the pressure switch and defines a flow path for the fluid. The pressure-transducing element is disposed in the flow path between the inlet and the outlet.

Pressure switches of this type are known from, e.g., DE 19 57 687 A, JP 08-304197 A and DE 101 55 839 A1 (US 2002-0059833). They are utilized, e.g., in lubrication systems that supply grease to machine components. In such applications, the grease must be maintained at a certain pressure. If the pressure drops, more grease must be pumped by a grease pump. Accordingly, a pressure switch of the above-mentioned type monitors the pressure of the grease (lubricant), which is disposed in a defined portion of the system, in real time.

Known pressure switches typically have a blind end (dead space) in the connector before the pressure chamber. The grease does not circulate in the blind end (dead space) and consequently it is not flushed out (replaced) during operating. Therefore, the grease located there can age and the aging is accelerated by the alternating pressure. As a result, the grease may separate over the time (i.e. the base oil "bleeds out") and harden.

The designs of the above-noted pressure switch necessitate such a dead space (blind end), which may be even further enlarged by inserting T-pieces in the vicinity of other connection fittings.

The above-mentioned grease hardening effect is strongly dependent on the specific bleeding behavior of the grease, as well as its flow properties and its solid content. However, appropriate selection of the grease for the particular system can minimize this problem only to a limited extent.

Therefore, in previously known pressure switches of the above-mentioned type, a grease plug can form and harden to such a degree that the pressure switch does not function any more, i.e. it no longer switches in accordance with its rated pressure threshold(s).

SUMMARY

In one aspect of the present teachings, a pressure switch is disclosed that is capable of avoiding the above-mentioned disadvantageous effect. Therefore, it is possible to reliably avoid an impairment of the function of the pressure switch due to a fluid hardening during use.

In another aspect of the present teachings, a pressure-transducing element utilized by the pressure switch has a cylindrical shape with a constant diameter. The pressure-transducing element is displaceably disposed in a bore in the housing and the bore has a constant bore diameter. One end of the pressure-transducing element extends into the flow path and the other end is disposed in the housing. Such a design is capable of minimizing or preventing the above-noted grease hardening problem.

In a preferred embodiment, at least a portion of the flow path is cylindrical, i.e. it has a circular cross-section. The pressure-transducing element is preferably disposed in at least a portion of the cylindrical segment.

The inlet and the outlet of the pressure switch may each include a threaded segment and the respective threads may be cut directly into the housing. The diameter of the threaded segment(s) is preferably larger than the diameter of the flow path between the inlet and the outlet.

Preferably, the flow path and the threaded segment have a concentric axis, i.e. they are concentric or are co-axially disposed. The longitudinal axis of the flow path and the longitudinal axis of the pressure-transducing element extend, particularly preferably, perpendicular to each other, or are substantially perpendicular to each other. The pressure-transducing element preferably has an overall pin shape.

The pressure switch can include an integrated measuring port for the measured pressure. It is also possible to directly connect the pressure switch with a manometer.

Pressure switches according to the present teachings are preferably designed such that at least a portion of the pressure-transducing element (i.e. a pressure transmitting element) is surrounded by the fluid or medium (e.g. grease or another lubricant), the pressure of which will be measured. In this case, the design can prevent the fluid or medium from accumulating in a dead space and/or reservoir within the pressure switch and remain there for a long time. It thus avoids the above-described grease hardening effect, which can impair the functional capability of the pressure switch. More particularly, hardened grease will not accumulate in the vicinity of the pressure-transducing element according to such designs.

In another aspect of the present teachings, the pressure switch may be installed in (integrated into) a pressure line, i.e. a conduit that conveys a fluid or medium (e.g., a grease) under pressure.

In another aspect of the present teachings, the pressure switch can be advantageously utilized with greases that are based on mineral and/or synthetic oils.

Pressure switches according to the present teachings can reliably function across a wide range of pressures, such as, e.g., switching pressures between 20 bar and 320 bar.

In certain embodiments of the present teachings, the pressure switch can function properly even at low temperatures, at which the danger is particularly high that grease could harden and block the pressure switch.

Further objects, embodiments, advantages and designs will be explained in the following with the assistance of the exemplary embodiment and the appended FIGURE.

BRIEF DESCRIPTION OF THE DRAWING

The sole FIGURE depicts a cross-section through a representative pressure switch of the present teachings.

DETAILED DESCRIPTION OF THE INVENTION

The illustrated pressure switch 1 may be advantageously utilized to monitor and, if necessary turn on or off, a lubricating process in a lubrication system. The pressure switch 1 has two connectors for the pressure line, in which it can be installed, i.e. an inlet 5 and an outlet 6. That is, the pressure switch 1 may be installed in a pressure line, through which a pressurized medium (fluid) flows. Preferably, the pressure switch 1 is disposed before the last valve (metering valve) in the pressure line, although the particular application of the pressure switch according to the present teachings is not particularly limited.

The pressure switch 1 has a housing 2 that can be manufactured from a single metal block. A cavity 3 is formed in the housing 2 and is formed to admit and pass a fluid (e.g., grease). The pressure of the fluid can be measured as it passes through the cavity 3 by utilizing a pressure-transducing element 4. This element functions as pressure transmitting element and is preferably formed like a plunger or push rod. At least a portion of the pressure-transducing element 4 is slidably disposed in a bore 10 of the housing 2 and at least a portion of the pressure-transducing element 4 preferably extends into the cavity 3, in which the pressurized fluid is located, i.e. into the fluid flow path.

The cavity 3 defines a flow path 7 for conveying the pressurized fluid between the inlet 5 and the outlet 6. The pipe lines (not illustrated) are preferably connected via threaded segments 8 and 9 of the inlet 5 and the outlet 6, respectively.

At least a portion of the flow path 7 between the inlet 5 and the outlet 6 is preferably cylindrical. The diameter of the flow path 7 is denoted by d. The diameter D of the threaded segments 8 and 9 of the inlet 5 and the outlet 6, respectively, is larger, preferably significantly larger, than the diameter d of the flow path 7.

The threaded segment 8 of the inlet 5, the flow path 7 and the threaded segment 9 of the outlet 6 are located on a concentric axis a, i.e. they are co-axially arranged. The pressure-transducing element 4 is cylindrical in the present embodiment and has a longitudinal axis L that is preferably perpendicular to the axis a, which is also the longitudinal axis of the bore 10. However, instead of a perpendicular arrangement of the above-mentioned axes, the angle between the axes a and L may be, e.g., between 60° and 90°.

The pressure-transducing element 4 is preferably formed in a pin-shaped manner and, more preferably, in the shape of a cylindrical pin. Herein, the term "pin-shaped" is intended to mean that the length of the pressure-transducing element 4 is greater (longer) than the diameter of the element 4.

The design of the present embodiment ensures that at least the terminal end of the pressure transmitting element 4 is surrounded and/or immersed in the fluid, such that no dead space results. Consequently, there is no danger that grease will accumulate inside the pressure switch and harden, thereby impairing the function of the pressure switch, which is a particular concern in low temperature operations of a grease supply line.

The pressure switch 1 can be provided and/or connected with a measurement port (not illustrated) for a manometer and/or can be connected directly with a manometer.

Pressurized fluid in the flow path 7 acts on the pressure-transducing element 4, i.e. on the pressure plunger, and causes it to displace (slide) it in the direction of the double arrow. The amount of displacement of the element 4 against the restoring force of a non-illustrated spring element is measured and a signal corresponding to the pressure in the flow path 7 can be generated therefrom in a known manner. The pressure of the grease in the pressure line can then be ascertained from this signal utilizing well-known techniques.

A representative, non-limiting example of the present invention was described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pressure switches and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

LIST OF REFERENCE NUMBERS

1 Pressure switch
2 Housing
3 Cavity
4 Pressure-transducing element
5 Inlet
6 Outlet
7 Flow path
8 Threaded segment
9 Threaded segment
10 Bore
D Diameter of the threaded segment
d Diameter of the flow path
a Axis
L Longitudinal axis

The invention claimed is:

1. A pressure switch comprising:
a housing having a cavity for receiving a fluid, the pressure of which will be measured, the cavity extending from an inlet to an outlet and defining a flow path for the fluid, and
a pressure-transducing element for measuring the fluid pressure, the pressure-transducing element being in fluid communication with the cavity and at least partially disposed in the flow path between the inlet and the outlet,
wherein the pressure-transducing element has a cylindrical shape with a constant diameter,
the pressure-transducing element is partially disposed in a bore in the housing, the bore having a constant bore diameter,
one end of the pressure-transducing element extends into the flow path, and
the pressure-transducing element is movable in the bore such that the pressure-transducing element is configured to move further into or further out of the flow path in response to a change in the pressure of the fluid in the flow path.

2. The pressure switch according to claim 1, wherein at least one portion of the flow path is cylindrical.

3. The pressure switch according to claim 2, wherein the pressure-transducing element is disposed in the cylindrical portion of the flow path.

4. The pressure switch according to claim 1, wherein the inlet and the outlet each have a threaded segment with a thread that is cut directly into the housing.

5. The pressure switch according to claim 4, wherein the threaded segments each have an inner diameter that is greater than the diameter of the flow path between the inlet and the outlet.

6. The pressure switch according to claim 5, wherein the flow path and the threaded segments are concentric.

7. A pressure switch comprising:
a housing having a cavity for receiving a fluid, the pressure of which will be measured, the cavity extending from an inlet to an outlet and defining a flow path for the fluid, and
a pressure-transducing element for measuring the fluid pressure, the pressure-transducing element being in fluid communication with the cavity and at least partially disposed in the flow path between the inlet and the outlet,
wherein the pressure-transducing element has a cylindrical shape with a constant diameter, the pressure-transducing element is partially disposed in a bore in the housing, the bore has a constant bore diameter, and one end of the pressure-transducing element extends into the flow path,
wherein at least one portion of the flow path is cylindrical, the pressure-transducing element is disposed in the cylindrical portion of the flow path, and
wherein the inlet and the outlet each have a threaded segment with a thread that is cut directly into the housing.

8. The pressure switch according to claim 7, wherein the threaded segments each have an inner diameter that is greater than the diameter of the flow path between the inlet and the outlet.

9. The pressure switch according to claim 8, wherein the flow path and the threaded segments are concentric.

10. The pressure switch according to claim 9, wherein the flow path has a longitudinal axis that is at least substantially perpendicular to a longitudinal axis of the pressure-transducing element.

11. The pressure switch according to claim 10, further comprising an integral measuring port.

12. A pressure switch comprising:
a housing having a bore and a cavity, the cavity extending from an inlet to an outlet so as to define a flow path for a fluid under pressure, and
a cylindrical pin having at least a first terminal end slidably disposed in the bore and at least a second terminal end disposed in the flow path between the inlet and the outlet, the cylindrical pin being displaceable based upon changes in the pressure of the fluid located in the flow path.

13. The pressure switch according to claim 12, wherein the flow path is cylindrical.

14. The pressure switch according to claim 12, wherein the flow path has a longitudinal axis that is at least substantially perpendicular to a longitudinal axis of the cylindrical pin.

15. The pressure switch according to claim 12, wherein the bore and the cavity extend relative to each other at an angle between 60° and 90°.

16. The pressure switch according to claim 12, wherein the bore is perpendicular to the flow path.

17. The pressure switch according to claim 12, wherein the inlet and the outlet each have a threaded segment with a thread that is cut directly into the housing.

18. The pressure switch according to claim 17, wherein the threaded segments each have an inner diameter that is greater than the diameter of the flow path between the inlet and the outlet.

19. The pressure switch according to claim 18, wherein the flow path and the threaded segments are concentric.

20. The pressure switch according to claim 19, wherein the flow path is cylindrical and is perpendicular to the bore.

* * * * *